United States Patent [19]

Cassidy et al.

[11] Patent Number: 5,142,013
[45] Date of Patent: Aug. 25, 1992

[54] ISOCYANATE REACTIVE POLYMERS HAVING IMINO/ENAMINE FUNCTIONALITY

[75] Inventors: Eduard F. Cassidy, Ukkel, Belgium; Herbert R. Gillis, Sterling Heights, Mich.; Malcolm Hannaby, Leuven, Belgium; Jan W. Leenslag, Neerijse, Belgium; Alain Parfondry, Evere, Belgium

[73] Assignees: ICI Americas Inc., Wilmington, Del.; Imperial Chemical Industries PLC, London, England

[21] Appl. No.: 400,636

[22] Filed: Aug. 30, 1989

Related U.S. Application Data

[63] Continuation-in-part of Ser. No. 378,445, Jul. 7, 1989, Pat. No. 4,935,460, which is a continuation of Ser. No. 242,745, Sep. 9, 1988, abandoned, which is a continuation-in-part of Ser. No. 160,647, Feb. 26, 1988, Pat. No. 4,794,129, which is a continuation-in-part of Ser. No. 105,641, Oct. 6, 1987, abandoned.

[30] Foreign Application Priority Data

Mar. 11, 1987 [GB] United Kingdom ................ 8705801

[51] Int. Cl.⁵ .................... C08J 53/07; C08L 5/5353
[52] U.S. Cl. .......................................... 528/44; 528/52; 528/59; 521/159; 521/160
[58] Field of Search ............................ 528/44, 52, 59; 521/159, 160; 524/251

[56] References Cited

U.S. PATENT DOCUMENTS

| | | | |
|---|---|---|---|
| 3,314,922 | 4/1967 | Berchtold | 528/59 |
| 4,720,535 | 1/1988 | Schleier et al. | 528/59 |
| 4,794,129 | 12/1988 | Gillis, Jr. et al. | 521/121 |
| 4,906,674 | 3/1990 | Cassidy et al. | 521/159 |
| 4,910,279 | 3/1990 | Gillis et al. | 528/49 |

Primary Examiner—John Kight, III
Assistant Examiner—Duc Truong

[57] ABSTRACT

An isocyanate-reactive polymer comprising the reaction product of: (a) an isocyanate-terminated polyurethane prepolymer formed by reacting a polymeric polyol having a hydroxyl equivalent weight of at least 500 with a stoichiometric excess of an organic polyisocyanate, and (b) a stoichiometric excess, relative to the free isocyanate groups present in the prepolymer, of an imino-functional or enamine containing compound having a molecular weight less than about 750. The polymer is useful in reaction injection molding systems as an isocyanate-reactive ingredient.

13 Claims, No Drawings

ISOCYANATE REACTIVE POLYMERS HAVING IMINO/ENAMINE FUNCTIONALITY

This is a continuation-in-part of Ser. No. 07/378,445, filed Jul. 7, 1989, now U.S. Pat. No. 4,935,460, which is a continuation of Ser. No. 07/242,745, filed Sep. 9, 1988, now abandoned, which is a continuation-in-part of Ser. No. 07/160,647, filed Feb. 26, 1988, now U.S. Pat. No. 4,794,129, which is a continuation-in-part of Ser. No. 07/105,641, filed Oct. 6, 1987, now abandoned.

This invention relates to compositions of matter and more particularly to isocyanate-reactive polymers and compositions and to their use in the production of mouldings by the reaction injection moulding process.

One of the more important methods of making isocyanate based cellular or non-cellular elastomers in the technique known as reaction injection moulding (RIM) whereby two highly reactive liquid streams are impingement mixed and rapidly injected into a mould cavity. The two streams generally comprise a polyisocyanate or derivative thereof, usually known as the "A" component, and an isocyanate reactive stream, known as the "B" component, commonly containing polyol and/or polyamine reactants.

Reaction injection moulded polyurea elastomers, generally made from "B" components comprising a mixture of aromatic and aliphatic polyamines, possess many advantages in processing and physical properties over the corresponding polyurethane and polyurethane-urea elastomers. However, because of the high reactivity of the aliphatic amines, the flow and mould-filling characteristics of these polyurea systems often leave much to be desired.

In our U.S. Pat. No. 4,794,129, it has been disclosed that certain imines derived from certain aliphatic amine-terminated polyethers have a much more desirable reactivity profile than the amines, particularly primary aliphatic amines, used in polyurea RIM systems. Whilst the imines described in that application can be prepared from polyether polyamines by well known chemical reactions (for example reacting the polyamine with an aldehyde or ketone), the polyether polyamines themselves are generally difficult to manufacture and are therefore expensive.

It has now been found that imine-terminated or enamine-terminated polymers, useful in the production of RIM elastomers and other products, can be prepared by simple reactions from relatively inexpensive starting materials.

Accordingly, the present invention provides an isocyanate-reactive polymer comprising the reaction product of:

(a) an isocyanate-terminated polyurethane prepolymer formed by reacting a polymeric polyol having a hydroxyl equivalent weight of at least 500 with a stoichiometric excess of an organic polyisocyanate, and (b) a stoichiometric excess, relative to the free isocyanate groups present in the prepolymer, or an imino-functional or enamine-containing compound having a molecular weight less than about 750. Unless otherwise stated, the expressions "equivalent weight" and "molecular weight" as used throughout the present specification refers to the equivalent weight values as may be calculated by measuring the content of functional groups per weight of polymer sample, and to the molecular weight values as may be calculated from the thus obtained equivalent weight and the theoretical functionality of the polymers.

Organic polyisocyanates which may be used in the preparation of the isocyanate-terminated polyurethane prepolymers include aliphatic, cycloaliphatic, araliphatic and aromatic polyisocyanates, for example hexamethylene diisocyanate, isophorone diisocyanate, cyclohexane-1,4-diisocyanate, dicyclo-hexylmethane-4,4-diisocyanate, p-xylylene diisocyanate, phenylene diisocyanates, tolylene diisocyanates, 1,5-naphthylene diisocyanate and the available MDI isomers, that is to say 4,4'-diphenylmethane diisocyanate, 2,4'-diphenylmethane diisocyanate and mixtures thereof. Whilst diisocyanates are the preferred polyisocyanates for use in the preparation of prepolymers, mixtures of diisocyanates with minor proportions of higher functionality polyisocyanates may be used if desired although the viscosities of the resulting prepolymers will then generally be higher. Unsymmetrical diisocyanates such as 2,4-tolylene diisocyanate and isophorone diisocyanate are useful for minimising chain extension.

Polymeric polyols which may be used in the preparation of the isocyanate-terminated polyurethane prepolymers typically have average nominal hydroxyl functionalities of from 2 to 5 and average hydroxyl equivalent weights in the range 750 to 5000. Preferred polymeric polyols have average nominal hydroxyl functionalities of 2 or 3 and average hydroxyl equivalent weights in the range from about 1000 to about 3000. Suitable polyols and methods for their preparation have been fully described in the prior art. As examples of suitable polyols, there may be mentioned polyesters, polyesteramides, polythioethers, polycarbonates, polyacetals, polyolefins, hydrocarbons, polysiloxanes and, especially, polyethers.

Polyether polyols which may be used include products obtained by the polymerization of a cyclic oxide, for example ethylene oxide, propylene oxide or tetrahydrofuran in the presence, where necessary, of polyfunctional initiators. Suitable initiator compounds contain a plurality of active hydrogen atoms and include water and polyols, for example ethylene glycol, propylene glycol, diethylene glycol, cyclohexane dimethanol, resorcinol, bisphenol A, glycerol, trimethylolpropane, 1,2,6-hexanetriol or pentaerythritol. Mixtures of initiators and/or cyclic oxides may be used. Especially useful polyether polyols include polyoxypropylene diols and triols and poly(oxyethylene-oxypropylene) diols and triols obtained by the simultaneous or sequential addition of ethylene and propylene oxides to di- or trifunctional initiators as fully described in the prior art. Polyoxypropylene diols and/or triols are most preferred. Mixtures of the said diols and triols can be particularly useful. Other particularly useful polyether polyols include polytetramethylene glycols obtained by the polymerisation of tetrahydrofuran. Polyester polyols which may be used include hydroxyl-terminated reaction products of polyhydric alcohols such as ethylene glycol, propylene glycol, diethylene glycol, 1,4-butanediol, bis(hydroxyethyl) terephthalate, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl ethers, sebacic acid, phthalic anhydride, tetrachlorophthalic anhydride or dimethyl terephthalate or mixtures thereof. Polyesteramides may be obtained by the inclusion of aminoalcohols such as ethanolamine in polyesterification mixtures. Polyesters obtained by the polymerisation of lactones, for example caprolactone, in conjunction with a polyol, may also be used. Polythioether polyols which may be used include products obtained from thiodiglycol either alone or with other glycols, alkylene oxides, dicarboxylic acids, formaldehyde, amino-alcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, cyclic carbonates or phosgene. Polyacetal polyols which may be used include those prepared by reacting glycols such as diethylene glycol, triethylene glycol or hexanediol with formaldehyde. Suitable polyacetals may also be prepared by polymerising cyclic acetals.

Suitable polyolefin polyols include hydroxy-terminated butadiene homo- and copolymers and suitable polysiloxane polyols include polydimethylsiloxane diols and triols.

In preparing the isocyanate-terminated polyurethane prepolymers, the polyisocyanate and the the polyol may be reacted together using conditions that have been fully described in the prior art for the production of prepolymers. Thus, one or more polyisocyanates may be reacted with one or more polyols under substantially anhydrous conditions at temperatures between about 50° and about 180° C., optionally in the presence of catalysts, until reaction between the isocyanate groups and the hydroxyl groups is substantially complete. Suitable catalysts are known in the polyurethane art and include tin compounds such as dibutyltin dilaurate and tertiary amines such as triethylene diamine. It is preferable to avoid those catalysts which, under the conditions of prepolymer formation, promote competing isocyanate reactions such as trimerisation. The excess of organic polyisocyanate used in preparing the prepolymers is suitable such that the prepolymers have free NCO contents in the range of from about 0.3 to about 10%, preferably from about 2 to about 4% by weight.

Imino-functional compounds having a molecular weight in the range of about 43 to less than about 750 may be reacted with the isocyanate-terminated prepolymers to form the isocyanate-reactive polymers of the invention contain at least one isocyanate-reactive imino group per molecule and conform to the general structure:

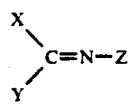

wherein X, Y and Z are chemical moieties which collectively form the rest of said compound and are each independently selected from hydrogen and organic radicals which are attached to the imino unit:

of said compound through N, C, O, S, Si or P, the central carbon atom of said imino unit being bonded to three atoms. In the above structure, neither the carbon nor the nitrogen atom of the imino unit should be incorporated within an aromatic or other fully conjugated ring or ring system. It is preferred that Z is attached to the imino unit through carbon and that X and Y are independently H or organic radicals attached through C, N or O. It is most preferred that X, Y and Z are attached through saturated atoms, preferably aliphatic carbon atoms.

Many types of imino-functional compounds are useful in this invention, including (but not limited to) those listed in Table A, following:

TABLE A

| TYPE | |
|---|---|
| $\text{P}-R^5-C=N-R^7$ with $R^6$ | Simple imine |
| $\text{P}-R^5-O-C=N-R^7$ with $R^6$ | Imino ester |
| $\text{P}-Ar-O-C=N-R^7$ with $R^6$ | Imino ester (aromatic) |
| $\text{P}-R^5-N=C$ with $R^6$, $R^7$ | Simple imine |
| $\text{P}-R^5-NR^6-C=N-R^8$ with $R^7$ | Amidine |
| $\text{P}-R^5-N=C$ with $R^6$, $Ar'$ | Simple imine (aromatic) |
| $\text{P}-R^5-NR^6-C=N-Ar'$ with $R^7$ | Amidine (aromatic) |
| $\text{P}-R^5-C=N-R^6$ with $OR^7$ | Imino ester (aliphatic) |
| $\text{P}-R^5-C=N-R^6$ with $OAr'$ | Imino ester (aromatic) |
| $\text{P}-R^5-NH-C=NR^6$ with $NHR^6$ | Guanidine |
| $\text{P}-R^5-NR^7-C(=NR^8)(NR_2^8)$ | Guanidine |
| $\text{P}-R^5-NH-C=NAr'$ with $NHAr'$ | Guanidine (aromatic) |
| $\text{P}-R^5-O-C=N-R^6$ with $NHR^6$ | Isourea |
| $\text{P}-R^5-O-C=N-R^7$ with $NH_2$ | Isourea | wherein:

$R^5$ and Ar are divalent aliphatic and aromatic organic linking groups, respectively;

P represents a organic chain or radical, to which said imino (C=N) functional group is attached as indicated by the drawings.

$R^6$ is H or a monovalent organic aliphatic group of 1 to 10 carbons;

$R^7$ and $R^8$ are monovalent aliphatic organic groups of 1 to 10 carbon atoms, and Ar' is a monovalent aromatic organic group of 6 to 18 carbon atoms.

These stated groups are well known in the art. Thus $R^5$ may in particular be propylene, Ar methoxyphenylene, $R^6$ propyl, $R^7$ propyl, $R^8$ propyl and Ar' methoxyphenyl. It is noted that in the above formulas any two of the three substituents attached to the imino unit can be incorporated as members of a non-aromatic 5 or 6 membered ring. The ring can be carbocyclic or heterocyclic depending, of course, on the particular substituents so incorporated and on whether the carbon or the nitrogen atom (or both) of the imino unit are also incorporated. When aromatic groups are present in the imino unit it is preferable that they be attached to the carbon atom of said unit and it is most preferred that said aromatic group bear electron donating substituents such as hydroxy, alkoxy N,N-dialkyl-amino etc. The preparation of these imino functional groups in both cyclic and acylic forms is well known in the literature. Isoureas are generally prepared by the reaction of an alcohol with a carbodiimide in the presence of a suitable catalyst. The alcohol component may be aliphatic, as described in E. Schmidt, F. Moonsmuller, Lieb. Ann. 597, 235, (1956), or aromatic as in E. Vowinkel, Chem. Ber., 96, 1702, (1963). The catalyst employed in these reaction are frequently chloride salts of copper, such as the use of copper (I) chloride in E. Vowinkel, I. Buthe, Chem. Ber., 107, 1353, (1974), or copper (II) chloride, as in E. Schmidt, E. Dabritz, K. Thulke, Lieb. Ann., 685, 161, (1965). However the reaction can also be carried out by the addition of an alkaline metal to the alcohol component as exemplified by the use of sodium metal in H. G. Khorana, Canad. J. Chem. 32, 261, 1953. Guanidines can be prepared by the reaction of an amine with a carbodiimide in a manner similar to that outlined in the references cited above. Alternatively alkylguanidines may be prepared by the reaction of an alkylamine salt with dicyandiamide as in E. A. Werner, J. Bell, J. Chem. Soc., 121, 1790, (1922). In yet another method s-methylthiourea sulphate is combined with an alkylamine as described in "Heterocyclic Chemistry", A. Albert, Althone Press, London, 1968. A general review of the preparation of imidates is given in "The Chemistry of amidines and imidates", Ed. S. Patai, chapter 9, "Imidates including cyclic imidates", D. G. Neilson, John Wiley, London, 1975. This work includes references to the preparation of the analogous thioimidates. The preparation of acylic imidates by the combination of an aliphatic or aromatic nitrile with an alcohol under acidic or basic conditions is described in F. C. Schaefer, G. A. Peters, J. Org. Chem., 26, 412, (1961). The preparation of cyclic imidates, such as oxazolines and dihydro-1,3-oxazines, by the Ritter reaction (addition of 1,3-diols or epoxides to a nitrile under acid catalysis) is described in "Advances in heterocyclic chemistry", Vol. 6, Ed. A. R. Katritzky, A. R. Boulton, Section II.A, "Heterocyclic synthesis involving nitrilium salts and nitriles under acidic conditions", F. Johnson, R. Madronero, Academic Press, New York, 1966 and references therein. In addition this text teaches the preparation of thioimidates such as thiazolines and dihydro-1,3-thiazines. Methods for the preparation of oxazolines and oxazines are also described in U.S. Pat. No. 3,630,996 to D. Tomalia, U.S. Pat. No. 3,640,957 to D. Tomalis and R. J. Thomas, in H. Witte, W. Weeliger, Angew. Chem. Int. Ed., 1972, 287 and in U.S. Pat. No. 3,813,378 to H. Witte and W. Seeliger. A general review of the preparation of amidines is given in "The Chemistry of amidines and imidates", Ed. S. Patai, chapter 7, "Preparation and synthetic uses of amidines". The general class of five membered ring amidines known as imidazolines can be prepared in a manner similar to that outlined above by the combination of a nitrile containing compound with ethylenediamine in the presence of an acid catalyst. Alternatively these materials can be prepared by the combination of ethylenediamine with carboxylic acids under dehydrating conditions. Other methods for the preparation of these materials include the combination of ethylenediamine with thioamides or with an imino ether hydrochloride. These procedures are described in "The Chemistry of Heterocyclic compounds: Imidazole and its Derivatives", Part I. Ed. A. Weissberger, author K. Hofman, Interscience Publishers, New York, 1953 and references therein. Particularly useful for the preparation of imidazoline terminated softblocks from cyanoethylated polyether polyols would be the method outlined in U.S. Pat. No. 4,006,247 to H. P. Panzer. The preparation of the homologous tetrahydropyrimidines can be achieved in a similar manner by the use of 1,3-propanediamine as the diamine component. Specific methods are described in "The Chemistry of Heterocyclic Compounds: The Pryimidines, Supplement I", Ed. A. Weissberger and E. C. Taylor, author D. J. Brown, Interscience Publishers, New York, 1953. The preparation of an imine can be achieved by any of a number of well documented procedures. In particular these materials can be obtained by the combination of a primary amine with an aldehyde or a ketone under dehydrating conditions. This and numerous alternative methods are contained in "The Chemistry of the Carbon-Nitrogen Double Bond", Ed. S. Patai, Interscience Publishers, London, 1970 and references therein. Suitable imino-functional compounds contain from one to four, preferably from one to three and most preferably two imino units per molecule although this will depend upon the use to which the isocyanate-reactive polymer is to be put. Preferred compounds have molecular weights in the range from about 57 to about 749. Examples of preferred imino-functional compounds include simple aldimines and/or ketimines such as may be obtained by reacting aldehydes, for example formaldehyde, acetaldehyde, propionaldehyde, n-butyraldehyde, isobutyraldehyde, heptaldehyde, alpha-methylvaleraldehyde, beta-methylvaleraldehyde, caproaldehyde, isocaproaldehyde or cyclohexyl aldehyde and mixtures thereof or ketones, for example acetone, methyl ethyl ketone, methyl n-propyl ketone, methyl isopropyl ketone, diethyl ketone, benzyl methyl ketone or cyclo-hexanone and mixtures thereof with primary amines, especially aliphatic diamines including particularly unsymmetrical diamines. Examples of suitable amines include hexamethylene diamine, menthane diamine, isophorone diamine, xylylene diamine, 2-methylpentamethylene diamine, polyoxyalkylene diamines and/or triamines and mixtures of such amines. Primary mono-amines may also be used either alone or together with diamines. Enamine-containing compounds having a molecular weight of about 60 to less than about 750 may be reacted with the isocyanate-terminated prepolymers to form the isocyanate-reactive polymers of the invention include compounds having the structures:

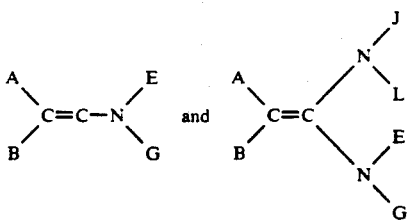

wherein each of A, B, D, E, G, J and L, independently, represents hydrogen or an optionally substituted hydrocarbon radical, any of A, B and D and, independently, any of E, G, J and L optionally being joined together to form one or more carbocyclic or heterocyclic rings.

In preferred enamino-functional compounds, E, G, J and L are not hydrogen. It is also preferred that not both of A and B are hydrogen. Examples of enamino-functional compounds contain two or more enamino groups as a result of any of A, B, D, E, G, J and/or L being a radical terminating in one or more enamino groups. Mono-enamines and mixtures of mono with di-enamines are also suitable. Suitable enamino-functional compounds may be obtained in known manner by reacting a carbonyl compound containing at least one alpha-hydrogen atom, for example an aliphatic, cycloaliphatic or araliphatic aldehyde or ketone such as acetaldehyde, propionaldehyde, isobutyraldehyde, caproaldehyde, cyclohexyl aldehyde, acetone, methyl ethyl ketone, benzyl methyl ketone, cyclopentanone, cyclohexanone, trimethylcyclohexanone, mixtures of these and the like with an aliphatic, cycloaliphatic, aromatic or heterocyclic secondary mono- or polyamine for example morpholine, piperazone or secondary amino-terminated low molecular weight polymers such as low molecular weight polyethers.

General techniques for the synthesis of enamines have been described in, for example, Org. Coatings and Plastics, Chem., 44, 151 and 157, (1981), ACS-PMSE preprints, August/September 1983, 456 and 461, and U.S. Pat. Nos. 4,342,841 and 4,552,945. Unsymmetrical di-imines or di-enamines are useful for minimising chain extension.

Reaction between the isocyanate-terminated polyurethane prepolymers and the imino-functional or enamine-containing compounds to form the isocyanate-reactive polymers of the invention may be effected by simple mixing at ambient temperatures but lower or higher reaction temperatures may be employed if desired. In one convenient method, the prepolymer is added to an excess of the low molecular weight imino-functional or enamine-containing compound. Solvents may be employed but are preferably avoided. The excess of imino-functional or enamine groups should preferably be such as to provide at least about one mole of imino-functional or enamine-containing compound per isocyanate equivalent, the product then being an isocyanate-reactive composition containing an isocyanate-reactive polymer having terminal imino-functional or enamine groups or intermediate reaction products thereof and unreacted iminofunctional or enamine-containing compound having a molecular weight less than about 750. If desired, the unreacted imino-functional or enamine-containing compound may be removed under reduced pressure, for example by using a thin film evaporator, leaving the isocyanate-reactive polymer which may be used directly or in combination with other isocyanate-reactive materials.

The viscosities of the isocyanate-reactive compositions may be controlled by appropriate selection of the type and amount of the imino-functional or enamine-containing compound used. It is preferred that such isocyanate-reactive compositions have viscosities not exceeding 6000 centipoises at the processing temperature used. It is most preferred that the viscosities do not exceed 4000 centipoises at 25° C.

The isocyanate-reactive polymers and isocyanate-reactive compositions of the invention may be reacted with organic polyisocyanates using techniques and items of processing equipment that have been fully described in the prior art so as to form useful cellular or non-cellular macromolecular materials.

The isocyanate-reactive compositions of the invention are of particular value in the production of moulded elastomers by the RIM technique, the compositions being reacted as "B" components, optionally in conjunction with other conventional ingredients, for example aromatic diamines, with conventional "A" components, that is to say organic polyisocyanates.

Thus, in a further aspect of the present invention, there is provided a reaction system for use in making a reaction injection moulded elastomer, said system comprising the following components:

(A) an organic polyisocyanate, and
(B) an isocyanate-reactive component comprising:
(i) an isocyanate-reactive composition comprising the reaction product of:
(a) an isocyanate-terminated polyurethane prepolymer formed by reacting a polymeric polyol having a hydroxyl equivalent weight of at least 500 with a stoichiometric excess of an organic polyisocyanate, and
(b) at least one mole, relative to the free isocyanate groups present in the prepolymer, of an imino-functional or enamine-containing compound having a molecular weight less than about 750, and
(ii) a chain extender comprising an aromatic polyamine containing two or three aromatically bound primary and/or secondary amino groups and having a molecular weight of from about 100 to about 400. Organic polyisocyanates which may be present in Component A of the reaction systems of the invention include the aliphatic, cycloaliphatic, araliphatic and, especially, the aromatic polyisocyanates mentioned above in relation to the preparation of the isocyanate-terminated polyurethane prepolymer. The preferred polyisocyanates include the aforementioned MDI isomers as well as polymeric (crude) MDI and MDI variants wherein the MDI has been modified by the introduction of urethane, allophanate, urea, biuret, amide, carbodiimide, uretonimine or isocyanaurate residues. Particularly useful polyisocyanates include isocyanate-terminated prepolymers prepared by reacting MDI with polymeric polyols and/or polyamines and also polyol-based prepolymers in which at least 20% of the initially formed urethane groups have been converted to allophanate groups. Aromatic polyamines useful as chain extenders in the reaction systems of the invention particularly include diamines, especially those having molecular weights between 122 and 300. Suitable diamines have been fully described in the prior art and include 3,5-diethyl-2,4-toluenediamine, 3,5-diethyl-2,6-toluenediamine, DETDA which is a mixture of about 80% by weight of 3,5-diethyl-2,4-toluenediamine and about 20% by weight of 3,5-diethyl-2,6-toluenediamine, 1,3,5-triethyl-2,6-diaminobenzene, 2,4-diaminotoluene, 2,6-diaminotoluene, 2,4'-diaminodiphenylmethane, 4,4'-diaminodiphenylmethane, 3,3'-dimethyl-5,5'-diethyl-4,4'-diaminodiphenylmethane, 3,3'5,5'-tetraisopropyl-4,4'-diaminodiphenylmethane and the like and mixtures thereof. If desired, the "B" Component of the reaction systems of the invention may contain further chain extenders in addition to the aromatic polyamine present in Component B (ii) and any unreacted low molecular weight imino-functional or enamine containing compound present in Component B (i). Such further chain extenders suitably have molecular weights below 1000 and may be selected from polyols, for example glycols, aliphatic polyamines, for example diamines, and additional imines or enamines. The "B" Component may also contain other softblock materials, for example polyols or polyamines having molecular weights greater than 1000, or other polyimines or polyenamines having molecular weights greater than 1000. Suitable polyols include those mentioned above in relation to the preparation of the prepolymer, especially polyether diols and/or triols. Suitable polyamines include the commercially available polyether diamines and triamines. The reaction systems of the present invention may further contain other conventional ingredients of such systems such as internal mould release agents, catalysts, surfactants, blowing agents, fillers (which may be reinforcements), plasticizers, fire retardants, coupling agents, and the like.

Suitable internal mould release agents include, for example, copper stearate, zinc stearate and a dimethyl polysiloxane with organic acid groups which is commercially available as Dow-Corning Q2-7119 from Dow-Corning Corporation. Other organo-polysiloxanes bearing organic hydroxyl groups (instead of acids) can also be used. A specific example of a very effective, hydroxy functional, polysiloxane internal mould release additive is L-412T (available from Goldschmidt A. G.). The amount of internal mould release agent used can be from about 0.001 to about 5.0 percent by weight of the total reactants (i.e. total polymer). Catalysts are generally not required during the preparation of polyureas by RIM. Catalysts may, however, be used if desired. Suitable catalysts include, for example, tertiary amines or organotin compounds, such as dibutyltin dilaurate, dibutyltin diacetate, diethyltin diacetate, dihexyltin diacetate, di-2-ethylhexyltin oxide, stannous octoate, stannous oleate, or a mixture thereof. Tertiary amine catalysts include trialkylamines which include, for example, triethylamine; heterocyclic amines such as N-alkylmorpholines which include, for example, N-methylmorpholine, N-ethylmorpholine; 2,2'-bis(dimethylamino)-diethyl ether; 1,4-dimethylpiperazine, triethylenediamine, and aliphatic polyamines such as N,N, N',N'-tetramethyl-1,3-butanediamine, or alkanolamines such as N-methyl diethanolamine. The amount of catalyst used will generally be less than about 5 percent by weight of the total reactants, preferably less than 1%. Combinations of tertiary amine and organotin catalysts are frequently used in the art. Isocyanurate catalysts, such as alkali and/or alkaline earth metal salts of carboxylic acids, may also be added to the formulations of the invention.

Suitable surfactants include, for example, sodium salts of castor oil sulfonates; alkali metal or ammonium salts of sulfonic acids such as dodecyl benzene sulfonic acid; and polyether siloxanes having a structure such that a copolymer of ethylene oxide and propylene oxide is attached to a polydimethyl siloxane radical. The amount of surfactant used is less than about 2 percent by weight of the total reactants, preferably less than 1%.

Suitable blowing agents include, for example, dissolved or dispersed gases such as air, $CO_2$, $N_2O$, or nitrogen, and low boiling halogenated hydrocarbons such as methylene chloride and trichloromonofluoromethane. The amount of blowing agent used is preferably less than about 4 percent by weight of the total reactants.

Suitable fillers include fiberglass reinforcement fibres, particularly those having lengths of from about 1/16 inch (0.16 cm) to about ⅛ inch (1.27 cm) and milled glass fibres having a length of 1/16 inch (0.16 cm), ⅛ (0.32 cm) or ¼ inch (0.64 cm) and the like. Shorter fibres are always preferred for ease of processing when they are incorporated as part of the "A" or "B" component streams. Other particularly suitable fillers are mica, fumed silica, flake glass, Wollastonite, calcium carbonate, carbon black, and the like. The products of the present invention can be shaped into useful articles such as automobile fascias, or panels, by reaction injection moulding (RIM) process, which is performed in a RIM machine. RIM machines are well known in the art and include those supplied by Admiral Equipment Corp., Akron, Ohio by Cincinnati Milacron Corp., Cincinnati, Ohio, by Battenfeld GmbH, Meinerzhagen, West Germany and by Krauss-Maffei GmbH, West Germany. The reagents may be blended in a suitable container and agitated at a temperature from about 20° C. to about 100° C. It is preferred to mix and process the ingredients of component (B) at or near ambient (20° C.) temperature. Ingredients B(i) and B(ii) should preferably not be heated (together) once mixed.

The "A" and "B" Components are placed in separate containers, which are generally equipped with agitators, of the RIM machine wherein the temperature of the "A" Component is 20° C. to about 125° C. It is preferred that the isocyanate temperature used for processing and mixing be below about 50° C., particularly if the isocyanate contains a catalyst or latent catalyst for the imine-isocyanate reaction. The temperature of the "B" Component can be between about 20° C. to about 80° C., but is preferably about 20° C. to about 40° C. The "A" Component and "B" Component are impingement mixed in a forced mix head such as, for example, a Krauss-Maffei mix head. The "A" and "B" Components are pumped to the mix head by a metering pump, for example, a Viking Mark 21A, at a discharge pressure from about 700 to about 5000 psi. It is sometimes necessary to maintain the component streams (A and B) within the pistons (or pumps), mix head, and all conduits connecting these components, at temperatures comparable to those which prevail within the storage tanks. This is often done by heat-tracing and/or by independent recirculation of the components.

The amounts of the "A" and the "B" Components pumped to the mix head is measured as the ratio by weight of the "A" Component to the "B" Component wherein the ratio is from about 9:1 to about 1:9, preferably from 3:1 to 1:3, depending upon the reactants used and the isocyanate index desired. It is preferred that a weight ratio be employed which yields a ratio of isocyanate equivalents in stream (A) to isocyanate-reactive functional groups in stream (B) between 0.70 and 1.90, preferably 0.90 to 1.30, more preferably 0.95 to 1.20.

This ratio of equivalents is known as the index and is often expressed as a percentage. The expression "isocyanate-reactive-functional-groups" are defined herein to include imine groups, primary and/or secondary amine groups (aromatic or aliphatic), hydroxyl groups, enamine groups, ketene aminal groups, mercapto(-SH) groups and carboxylic acids, said groups being organically bound.

Either or both streams may contain up to 40% of its weight in solid fillers or reinforcements. In a preferred embodiment, each stream contains at least 70% by weight of reactive species, not more than 30% by weight of fillers and/or reinforcements, and not more than 10% of other optional additives.

The impingement mixed blend of "A"/"B" streams is injected into a mould at a velocity from about 0.3 lb./sec. to about 70 lb./sec., preferably 5 to 20 lb./sec. The mould is heated to a temperature from about 20° C. to 250° C. Suitable moulds are made of metal such as aluminum or steel, although other materials can be used if they can withstand the processing conditions and wear. Usually an external mould release agent is applied before the first moulding. These are usually soaps or waxes which are solid at the mould temperature employed.

A moulded polymer article is formed after the impingement mixture is in the mould from about 1 second to about 30 seconds, preferably 5 to 20 seconds. The mould is then opened and the moulded product is removed from the mould. The moulded product may be post cured by placing the product in an oven having a temperature between 50° C. and about 250° c. for a time from about one-half hour to about 3 hours.

Mould filling may be accomplished in this invention in a more facile manner due to the reaction profile of the systems disclosed herein. Generally there is an induction period of about 1 to 5 seconds, usually 1 to 3 seconds, during which the reaction between the isocyanate- and the imino-functional or enamine-containing ingredients is flat or retarded. Following this induction period the reaction accelerates noticeably. This behaviour is in sharp contrast to that of the primary aliphatic amines used in the prior art. These amines appear to begin reacting with aromatic isocyanates on contact. These reaction profiles can be visualised by means of the adiabatic temperature-rise technique, which involves dispensing reaction systems (or two or more individual ingredients) through an impingement mixing device into a insulated cup equipped with thermocouples. The temperature rise due to the reaction is then monitored, at intervals of 0.1 sec. or less, and plotted versus time. Of course, as expected, the induction periods are most clearly evident when the imino compounds and/or enamino compounds are reacted neat (i.e., free of other ingredients) with the aromatic isocyanates. Moulded objects can be demoulded after the mould residence time of 30 seconds, often 15 seconds or less at a mould temperature less than 350° F., preferably less than 180° F.

Although not essential to the successful practice of this invention, it is within the scope of the invention to incorporate reactive ingredients into the reaction systems of the invention, in minor amounts, which are different from the types of reactants specifically described herein.

The individual components of the reaction systems are desirably stored and processed under an inert atmosphere such as dry air or nitrogen.

The formulations of the invention are processed at an isocyanate index between 0.70 and 1.90, preferably between 0.95 and 1.20; with the proviso that, if a catalyst for the conversion of isocyanate to isocyanurate groups is present, the index may extend up to about 15.00. Examples of suitable isocyanurate catalysts include alkali metal salts of carboxylic acids, for example, potassium 2-ethylhexoate. The invention is illustrated but not limited by the following Examples in which all parts, percentages and ratios are by weight unless otherwise indicated. In the Examples, Flexural Modulus was determined by ASTM D790;

Following is a list of materials employed in the Examples and comparative experiments.

A prepolymer having an isocyanate content of 4.5% was prepared by reacting an 80/20 mixture of 4,4'- and 2,4'-diphenylmethane diisocyanate with a polyoxypropylene triol having a molecular weight of 5000. An isocyanate-reactive composition was prepared by stirring 25.0 parts of the thus obtained prepolymer with 25.0 parts of a diimine prepared from cyclohexanone and a polyoxypropylene diamine of molecular weight of 400. 50.0 parts of DETDA were added to the isocyanate-reactive composition to give "B" component B1.

A prepolymer having an isocyanate content of 4.0% was prepared by reacting the MDI isomer mixture described above with a polyoxypropylene triol having a molecular weight of 5000. An isocyanate-reactive composition was prepared by stirring 33.3 parts of the thus obtained prepolymer with 33.3 parts of a diimine prepared from cyclohexanone and 2-methyl-1,5-pentanediamine. 33.3 parts of DETDA were added to the isocyanate-reactive composition to give "B" component B2. 50 parts of "B" component B1 were mixed with 50 parts of "B" component B2 to give isocyanate-reactive "B" component B3.

A prepolymer having an isocyanate content of 2.1% was prepared in cyclohexanone solution by reacting the MDI isomer mixture described for Prepolymer P1 (described below) with a polyoxypropylene triol having a molecular weight of 5000. The cyclohexane was removed by evaporation. An isocyanate-reactive composition was prepared by stirring 30.3 parts of the thus obtained prepolymer with 30.3 parts of a diimine prepared from cyclohexanone and a polyoxypropylene diamine of molecular weight 400. 30.4 parts of DETDA were added to the isocyanate-reactive composition to give "B" component B4.

Isocyanate prepolymer P1 having an isocyanate content of 14.7% was prepared by reacting 53.4 parts of the MDI isomer mixture described above with 46.6 parts of a polyoxypropylene diamine having a molecular weight of 2000.

Isocyanate prepolymer P2 having an isocyanate content of 14.3% was prepared by reacting 42.3 parts of the MDI isomer mixture described above with 23.9 parts of a polyoxypropylene diamine having a molecular weight of 2000, 23.9 parts of an ethylene oxide capped polyoxypropylene triol having an ethylene oxide content of 15% and a molecular weight of 5250 and 10 parts of a uretonimine modified variant of pure 4,4'-MDI having an NCO content of 29.5%.

Isocyanate prepolymer P3 having an isocyanate content of 17.3% was prepared by reacting 56.14 parts of the MDI isomer mixture described above with 43.86 parts of a polyoxypropylene diol having a molecular weight of 2000.

Isocyanate prepolymer P4 having an isocyanate content of 15.1% was prepared by reacting 28.62 parts of polyoxypropylene glycol 2000 with 36.42 parts of an 80/20 mixture of 4,4'- and 2,4'-diphenylmethane diisocyanates for two hours at 115° C. In the Examples, elastomers were prepared on a Battenfeld SHK-65 RIM machine at a mould temperature of 90° C. The isocyanate prepolymers and "B" components were impingement mixed in the proportions stated in the table.

TABLE 1

| | Examples | | | |
|---|---|---|---|---|
| | 1 | 2 | 3 | 4 |
| pbw of isocyanate prepolymer | 190 P1 | 209 P4 | 196 P2 | 215 P2 |
| pbw of "B" component | 100 B1 | 100 B1 | 100 B1 | 100 B1 |
| Flexural Modulus (MPa) | 843 | 900 | 853 | 769 |
| Elong. (%) | 59 | 59 | 83 | 70 |
| Heat Sag | | | | |
| (150 mm O/H, 160° C.) 30' (mm) | 10.5 | 4.0 | 1.0 | 11 |
| 60' | 20.5 | 19 | 2.0 | 29 |
| Impact (J) +20° C. | 39 | 38 | 45 | 36 |
| −20° C. | 18 | 19 | 15 | 26 |
| | 5 | 6 | 7 | 8 |
| pbw of isocyanate prepolymer | 179 P1 | 196 P1 | 185 P2 | 203 P2 |
| pbw of "B" component | 100 B3 | 100 B3 | 100 B3 | 100 B3 |
| Flexural Modulus (MPa) | 813 | 827 | 724 | 671 |
| Elong. (%) | 36 | 26 | 49 | 41 |
| Heat Sag | | | | |
| (150 mm O/H, 160° C.) 30' (mm) | 3 | 8 | 6.5 | 1 |
| 60' | 13 | 18.5 | 17.5 | 5 |
| Impact (J) +20° C. | 75 | 65 | 60 | 63 |
| −20° C. | 31 | 34 | 58 | 36 |
| | 9 | 10 | 11 | 12 |
| pbw of isocyanate prepolymer | 153 P3 | 168 P3 | 164 P1 | 180 P1 |
| pbw of "B" component | 100 B3 | 100 B3 | 100 B4 | 100 B4 |
| Flexural Modulus (MPa) | 724 | 721 | 744 | 821 |
| Elong. (%) | 88 | 61 | 59 | 40 |
| Heat Sag | | | | |
| (150 mm O/H, 160° C.) 30' (mm) | 10 | 9 | 1.5 | 1.0 |
| 60' | 26 | 18.5 | 8.5 | 1.0 |
| Impact (J) +20° C. | 64 | 72 | 32 | 33 |
| −20° C. | 41 | 36 | 23 | 24 |
| | 13 | 14 | 15 | 16 |
| pbw of isocyanate prepolymer | 169 P2 | 185 P2 | 164 P4 | 180 P4 |
| pbw of "B" component | 100 B4 | 100 B4 | 100 B2 | 100 B2 |
| Flexural Modulus (MPa) | 816 | 840 | 890 | 900 |
| Elong. (%) | 37 | 25 | 15 | 10 |
| Heat Sag | | | | |
| (150 mm O/H, 160° C.) 30' (mm) | 1 | 2 | 4 | 8 |
| 60' | 2.5 | 3 | 8 | 12 |
| Impact (J) +20° C. | 32 | 25 | 18 | 7 |
| −20° C. | 20 | 15 | 11 | 5 |

Prepolymer P5 having an isocyanate content of 1.97 percent was prepared in 100 parts of dry cyclohexanone by reacting 13 parts of tetramethylxylenediisocyanate (TMXDI) with 87 parts of an ethylene oxide capped polyoxypropylene triol having an ethylene oxide content of 15 percent and a molecular weight of 5250 in the presence of 0.05 parts of dibutyltin dilaurate catalyst.

EXAMPLE 17

An isocyanate-reactive resin component was prepared by reacting 100 parts of prepolymer P5 solution with 50 parts of the Schiff base formed by the reaction of 2-methyl-1,5-pentane diamine with 3-pentanone. After removing the residual solvent, 50 parts of this reaction product were mixed with 50 parts of DEDTA to give a B component B5 having a viscosity of 24 poise at room temperature.

EXAMPLE 18

An isocyanate-reactive resin component was prepared by reacting 80 parts of the prepolymer P5 solution with 60 parts of the Schiff base formed by the reaction of cyclohexanone with a polyoxypropylene diamine of 400 molecular weight. After removing the residual solvent, 50 parts of this reaction product were mixed with 50 parts of DEDTA to give a B component B6 having a viscosity of 16.4 poise at room temperature.

We claim:

1. An isocyanate-reactive polymer comprising the reaction product of:
   (a) an isocyanate-terminated polyurethane prepolymer formed by reacting a polymeric polyol having a hydroxyl equivalent weight of at least 500 with a stoichiometric excess of an organic polyisocyanate, and
   (b) a stoichiometric excess, relative to the free isocyanate groups present in the prepolymer, of an imino-functional or enamine-containing compound having a molecular weight less than about 750.

2. An isocyanate-reactive polymer according to claim 1 wherein the polyisocyanate used in preparing the prepolymer comprises a diphenylmethane diisocyanate.

3. An isocyanate-reactive polymer according to claim 1 wherein the polyisocyanate is an unsymmetrical diisocyanate.

4. An isocyanate-reactive polymer according to claim 1 wherein the polymeric polyol has an average nominal hydroxyl functionality of 2 to 3 and an average hydroxyl equivalent weight of from about 1000 to about 3000.

5. An isocyanate-reactive polymer according to claim 1 wherein the prepolymer has an NCO content in the range from about 0.3 to about 10% by weight.

6. An isocyanate-reactive polymer according to claim 1 wherein the imino-functional compound reacted with the prepolymer contains at least one isocyanate-reactive imino group per molecule and conforms to the general structure:—

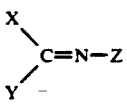

wherein X, Y and Z are chemical moieties which collectively form the rest of said compound and are each independently selected from hydrogen and organic radicals which are attached to the imino unit:

of said compound through N, C, O, S, Si or P, the central carbon atom of said imino unit being bonded to three atoms.

7. An isocyanate-reactive polymer according to claim 1 wherein the enamine-containing compound reacted with the prepolymer has the structure:

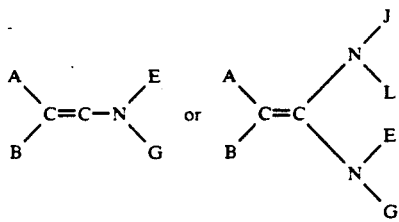

wherein each of A, B, D, E, G, J and L, independently, represents hydrogen or an optionally substituted hydrocarbon radical, any of A, B and D and, independently, any of E, G, J and L optionally being joined together to form one or more carbocyclic or heterocyclic rings.

8. An isocyanate-reactive polymer according to claim 7 wherein E, G, J and L are other than hydrogen and wherein not both of A and B are hydrogen.

9. An isocyanate-reactive polymer according to claim 1 wherein the imino-functional or enamine-containing compound is an unsymmetrical di-imine or di-enamine.

10. An isocyanate-reactive composition comprising an isocyanate-reactive polymer according to claim 1 blended with unreacted imino-functional or enamine-containing compound having a molecular weight of about 43 to about 750.

11. A reaction system for use in making a reaction injection moulded elastomer, said system comprising the following components:
(A) an organic polyisocyanate, and
(B) an isocyanate-reactive component comprising:
  (i) an isocyanate-reactive composition according to claim 10 and
  (ii) a chain extender comprising an aromatic polyamine containing two or three aromatically bound primary and/or secondary amino groups and having a molecular weight of from about 100 to about 400.

12. A reaction system according to claim 11 wherein the organic polyisocyanate comprises a diphenylmethane diisocyanate.

13. A reaction system according to claim 11 wherein the aromatic polyamine is a diamine having a molecular weight between 122 and 300.

* * * * *